No. 896,701. PATENTED AUG. 25, 1908.
E. AUSTIN.
PLANT STAKE.
APPLICATION FILED FEB. 4, 1907.
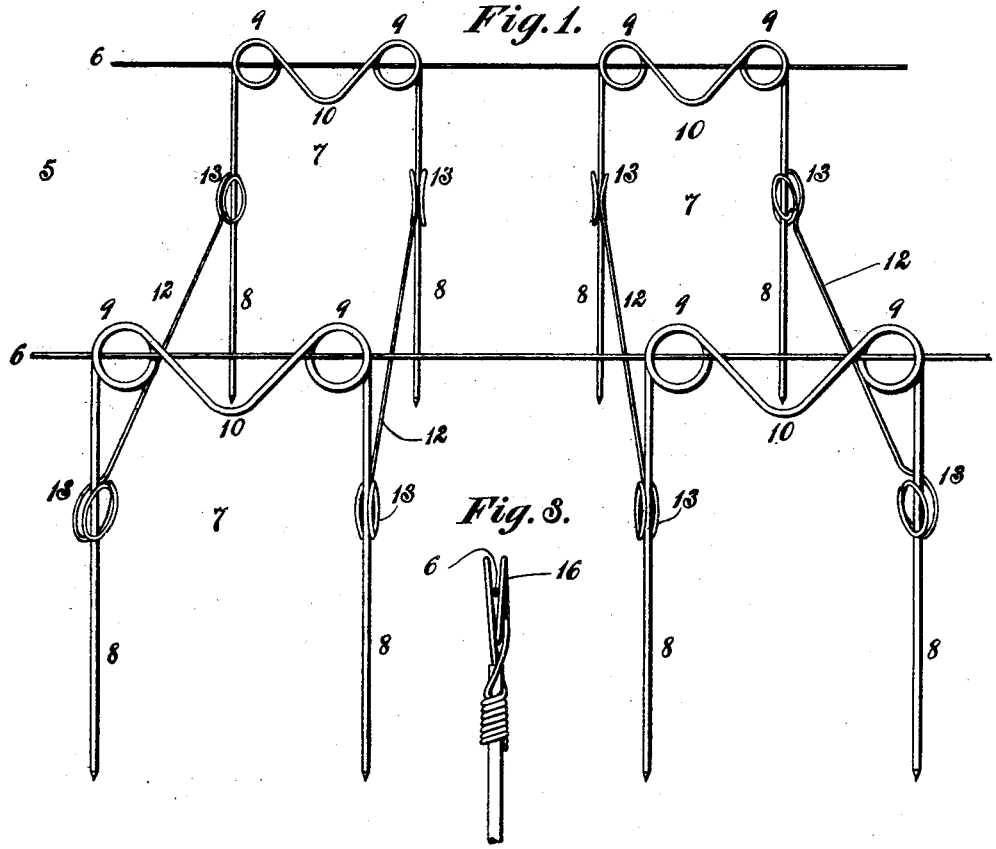
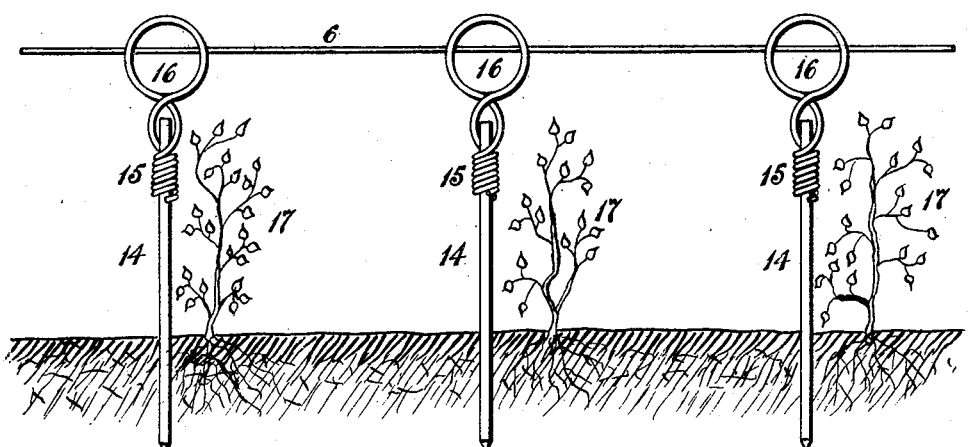
Witnesses:
F. E. Anderson
Francis A. Blodgett
Inventor:
Edgar Austin
By his Attorney,

UNITED STATES PATENT OFFICE.

EDGAR AUSTIN, OF SUFFIELD, CONNECTICUT.

PLANT-STAKE.

No. 896,701.      Specification of Letters Patent.      Patented Aug. 25, 1908.

Application filed February 4, 1907. Serial No. 355,711.

*To all whom it may concern:*

Be it known that I, EDGAR AUSTIN, a citizen of the United States, residing at Suffield, in the county of Hartford and State of Connecticut, have invented certain new and useful Improvements in Plant - Stakes, of which the following is a specification.

This invention relates to devices for horticultural use in training and supporting plants, and particularly to what are technically known as "plant-stakes" to which the growing plants may be connected, and thus be prevented from sagging, bending, or otherwise departing from correct position.

Primarily the object of the invention is the provision of improvements in the stakes to which the line-wires are secured, and to means on the stakes for clamping said line-wires in such a manner that they may be readily applied to the stakes.

Other objects of the invention will be set forth in the detailed description.

In the accompanying drawings, Figure 1 is a perspective view of a frame or arbor connected by plant-stakes, and the tie-rods, constituting one of the forms of my invention. Fig. 2 is a view in elevation of part of said frame or arbor, showing a different form of the plant-stake; and Fig. 3 is a detail view showing the action of the spring-clamp of the stake in either form upon the line-wire.

Referring to the drawings, the numeral 5 designates in a general way a frame or arbor between the line-wires 6 of which growing-plants are placed. In this form of the invention stakes 7, each having a pair of legs 8, are driven into the ground, and each of these stakes is of substantially-U-shape, and is preferably formed from one piece of metal, and is coiled at its top to provide a pair of spring-clamps 9, the metal of the top being preferably deflected as at 10 to enable convenient space to manipulate the double stake or to withdraw the line-wire from the clamp thereof.

Designated by 12 is a tie-rod for connecting the double stakes, said tie-rod having at each end a spring-clamp 13 adapted to be slipped over the legs of the stakes. A series of these tie-rods is provided, as illustrated in Fig. 1, and by employing them to unite the stakes a rigid structure is formed above the space in which the plants are placed. These plants may be secured to the legs of the stakes, to the line-wires, or to the braces 12 as circumstances require, and other forms of clamps may be substituted for those shown without departure from the invention.

In Fig. 2 a modification of the stakes is shown, and although illustrated as composed of two pieces of metal it may be formed in one piece without departure from the invention. In this form of the stake a rod 14 is provided to be driven into the ground, and adjacent to the upper end of said rod is coiled the lower portion 15 of a wire clip 16, the clip being clearly shown in Fig. 3, and one of the line-wires 6 being illustrated as clamped in place by said clip.

As will be obvious a series of stakes 14 is employed and these stakes may be arranged in double or parallel order as shown in said Fig. 1. So too the legs of these stakes may be connected by the tie-rods in the manner illustrated in Fig. 1.

Designated by 17 are growing plants which may be trained in any manner desired by connecting them to the stakes, and the frame or arbor composed of the line-wires, braces, and said stakes.

Other forms of clamp may be substituted for the form shown and the stakes may be varied in construction from either form illustrated, without departure from the invention.

In both forms of the invention I provide a plant-stake comprising a body-portion having a part coiled to present a plurality of coils disposed side by side to receive between them and clamp a line wire, and means connected with said body portion, adapted to be driven into the ground, for supporting said body portion above said ground.

Having thus described the invention, what I claim is:

1. A plant-stake consisting of an integral piece of wire looped intermediate its ends to form a resilient clamp, said ends forming legs adapted to be driven into the ground.

2. The combination with a series of line wires, and with plant stakes having resilient clamps for the reception of said line wires, of braces or tie rods uniting such plant-stakes.

3. The combination with a series of plant stakes each of which is formed of an integral piece of wire bent to form a resilient clamp, and with tie rods having similarly formed resilient clamps at their ends adapted to engage said plant-stakes, of a series of line wires adapted to be engaged by clamps of the plant-stakes.

4. The combination, with a frame or arbor composed of plant-stakes having clamps at their upper ends, of line-wires passing through the clamps; and braces having clamps at each end for connecting the legs of the plant-stakes.

5. A plant-stake comprising a body-portion having a part coiled to present a plurality of coils disposed side by side to receive between them and clamp a line wire, and means connected to said body-portion, adapted to be driven into the ground, for supporting said body portion above the ground.

In testimony whereof I affix my signature in presence of two witnesses.

EDGAR AUSTIN.

Witnesses:
F. E. ANDERSON,
J. D. WOOD.